US009346154B2

(12) United States Patent
Roehm

(10) Patent No.: US 9,346,154 B2
(45) Date of Patent: May 24, 2016

(54) ELECTRIC HANDHELD MACHINE TOOL

(75) Inventor: Heiko Roehm, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 661 days.

(21) Appl. No.: 13/313,419

(22) Filed: Dec. 7, 2011

(65) Prior Publication Data

US 2012/0152579 A1 Jun. 21, 2012

(30) Foreign Application Priority Data

Dec. 15, 2010 (DE) ........................ 10 2010 063 145
Nov. 23, 2011 (DE) ........................ 10 2011 086 919

(51) Int. Cl.

| | |
|---|---|
| ***B23B 45/16*** | (2006.01) |
| ***B25B 21/00*** | (2006.01) |
| ***B23Q 5/10*** | (2006.01) |
| ***B23Q 5/12*** | (2006.01) |
| ***B25B 21/02*** | (2006.01) |
| ***B25D 16/00*** | (2006.01) |
| ***B25F 5/00*** | (2006.01) |

(52) U.S. Cl.
CPC ................ *B25B 21/00* (2013.01); *B25B 21/02* (2013.01); *B25D 16/006* (2013.01); *B25F 5/00* (2013.01); *B25D 2216/0023* (2013.01); *B25D 2216/0038* (2013.01); *B25D 2250/255* (2013.01)

(58) Field of Classification Search
CPC ............. B25F 5/00; B25F 5/001; F16H 3/44; F16H 3/64; B25D 2216/003; B25D 2216/0038; B25D 16/006; B25D 2250/265; B25D 2250/255; B25D 2216/0023; B25B 21/008
USPC ............................ 173/48, 217, 216; 475/254
See application file for complete search history.

(56) References Cited

U.S. PATENT DOCUMENTS

| | | | | |
|---|---|---|---|---|
| 5,711,739 | A * | 1/1998 | Hashimoto et al. | 475/254 |
| 2001/0024601 | A1 | 9/2001 | Miescher et al. | |
| 2008/0032848 | A1 * | 2/2008 | Ho | 475/299 |
| 2010/0212923 | A1 | 8/2010 | Zimmermann et al. | |

FOREIGN PATENT DOCUMENTS

| | | |
|---|---|---|
| CN | 1227987 | 9/1999 |
| CN | 101117999 | 2/2008 |
| DE | 198 09 135 | 9/1999 |
| EP | 1 510 294 | 3/2005 |
| GB | 2468200 | 9/2010 |
| WO | WO 01/56144 | 8/2001 |
| WO | WO 2009/095095 | 8/2009 |
| WO | WO 2012/002578 | 1/2012 |

* cited by examiner

*Primary Examiner* — Robert Long
*Assistant Examiner* — Xavier A Madison
(74) *Attorney, Agent, or Firm* — Norton Rose Fulbright US LLP

(57) ABSTRACT

An electric handheld machine tool includes: a tool spindle driven by an electric motor; a gearing situated between the tool spindle and the electric motor; and a manually adjustable operating element which has an adjustment travel, the adjustment travel having at least two functional ranges. Upon switching over from a first functional range to a second functional range, a mechanical additional function of the gearing is mechanically connected. The operating element is configured as a part of a motor switching element for influencing the current through the electric motor.

11 Claims, 3 Drawing Sheets

ELECTRIC HANDHELD MACHINE TOOL

BACKGROUND OF THE INVENTION

1. Field of the Invention

The present invention relates to an electric handheld machine tool.

2. Description of the Related Art

An electric handheld machine tool is already known from Published German patent application document DE 198 09 135 A1. The known electric handheld machine tool has an operating element that is manually adjustable, in response to whose operation a torque coupling, situated between an electric motor and a tool spindle is changed in its type of operation. In a first functional range of the operating element, in this context, using the operating element, the maximum torque to be transmitted via the torque coupling is manually preselectable at various steps, while in the second functional range of the operating element, to set the type of operation "percussion drilling" and "drilling", the torque coupling is connected rigidly, that is, it acts as a blocking coupling.

Moreover, such electric handheld machine tools typically have a planetary gear having at least two gears, so that an operator is able to choose between a rapid gear ($2^{nd}$ gear) having a low torque and a slow gear ($1^{st}$ gear) having a high torque. Furthermore, these gearings have one or more additional functions, such as an adjustable torque limitation, a switch-off function for the torque limitation for drilling, a percussion drilling function that can be switched in, a rotary blow function that can be switched in or a hammer blow function that can be switched in. To do this, typically an operating element that is present in the electric handheld machine tool has to be operated. It is disadvantageous, in this context, that interrupting the current work being carried out is required for this, since the additional operating element has to be adjusted using the other hand, while the first hand is holding the handheld machine tool.

BRIEF SUMMARY OF THE INVENTION

An object of the present invention is refining an electric handheld machine tool in such a way that, without the interruption of a work process, it makes possible the mechanical switching of a mechanical additional function of the gearing. By the mechanical switching of a mechanical additional function, one may understand the switching on or off of a mechanical additional function. The present invention, in this context, is based on the idea of providing the mechanical switching on or off of the additional function via the operating element, which is developed at the same time as a part of the motor switching element for influencing the current through the electric motor. Consequently, via one and the same operating element, for example, the rotational speed of a screwdriver or drill may be influenced in a first functional range, and, by further pressing down or operating the operating element, into the second functional range, a mechanical additional function of the gearing, for instance, a percussion drilling function may be switched on.

Quite especially preferably it is provided that the operating element is developed as a pushbutton switch element. Such an operating element is known to the operator to the extent that, with it, usually the current through the electric motor is influenced which leads, for instance, to an increase in the rotational speed of the tool spindle during drilling. Moreover, the operating element may thereby be situated particularly in the hand grip area of the electric handheld machine tool, so that an especially secure guiding and holding of the electric handheld machine tool is made possible. The operation of the pushbutton switch element, in this context, takes place in such a way that, starting from an end position extending out of the housing of the electric handheld machine tool, the pushbutton switch element is moved into the housing, the strength of the current supplied to the drive motor within the first functional range being increased, while, in particular, the rotational speed of a drill is increased. When a specified switching point is overcome by connecting an additional displacement resistance, from which point onwards the push-in force of the pushbutton switch element increases overproportionally compared to the first functional range, the electric handheld machine tool is switched to the second functional range, for instance, a percussion drilling function, and when the pushbutton switch element is further pressed in, in the direction of the inside of the housing, the rotational speed continuing to increase.

In one further preferred embodiment of the present invention, it is provided that, when switching over between the two functional ranges, an increased displacement resistance has to be overcome which, when the operating element is unloaded, returns it again into the original functional range. It is thereby haptically signaled to the operator when he is leaving the first functional range and is reaching the second functional range. Furthermore, it is thereby ensured, after the end of the operation, that the handheld machine tool is set back again to its original functional state, i.e. to its first functional range.

Such an increased displacement resistance is produced especially simply by using at least one spring. The use of a spring is not only implementable in a relatively cost-effective manner, but moreover, it offers the possibility of a particularly easy setting of the additional displacement resistance via the length and/or the temper of the spring.

The use of the present invention is particularly preferred in a handheld machine tool developed as a cordless screwdriver.

It is preferably provided that the mechanical additional function is a percussion drilling function, a rotary blow function, a hammer drilling function, a rotational limitation or a change in the rotational limitation.

For the purpose of carrying out the mechanical additional function, the handheld machine tool, in particular, has a mechanical additional function assembly. The additional function assembly may be, for instance, a striking mechanism for a percussion drilling function, especially a step striking mechanism, or a striking mechanism for a rotary blow function, particularly a rotary striking mechanism or a striking mechanism for a hammer drilling function, in particular, a hammer blow mechanism. Such striking mechanisms for carrying out a percussion drilling function, a rotary blow function or a hammer drilling function are sufficiently known from the related art, and are therefore not explained here in greater detail. Connecting a striking mechanism as a mechanical additional function assembly permits operating the handheld machine tool in a striking functional range. By disconnecting the striking mechanism, the handheld machine tool is operated in a non-striking functional range. The connection and disconnection of a striking mechanism takes place in a manner known per se, and in a different manner, depending on the striking mechanism. In the case of a step striking mechanism, for example, the disconnection may take place by having the latching disk placed out of engagement. For connecting and disconnecting a hammer blow mechanism, for instance, of an eccentric striking mechanism, couplings are known whose coupling parts are placed in engagement or out of engagement.

In one preferred specific embodiment, the handheld machine tool according to the present invention is formed by a rotary blow screwdriver. As a mechanical additional function assembly, the rotary blow screwdriver has a rotary blow mechanism which is connectable and disconnectable in such a way that the rotary blow screwdriver has at least one first functional range, a non-striking function, particularly a drilling function, and a second functional range, a rotary blow function. In the non-striking functional range, the drilling function, at least one blocking element is put into operative connection with the axially movable striking element, in such a way that the axial motion of the striking element is prevented. The connecting and disconnecting of the rotary blow mechanism takes place with the aid of an operating element which is connected mechanically using a transmission element to the rotary blow mechanism, particularly to the at least one blocking element.

DETAILED DESCRIPTION OF THE INVENTION

Figure 1:
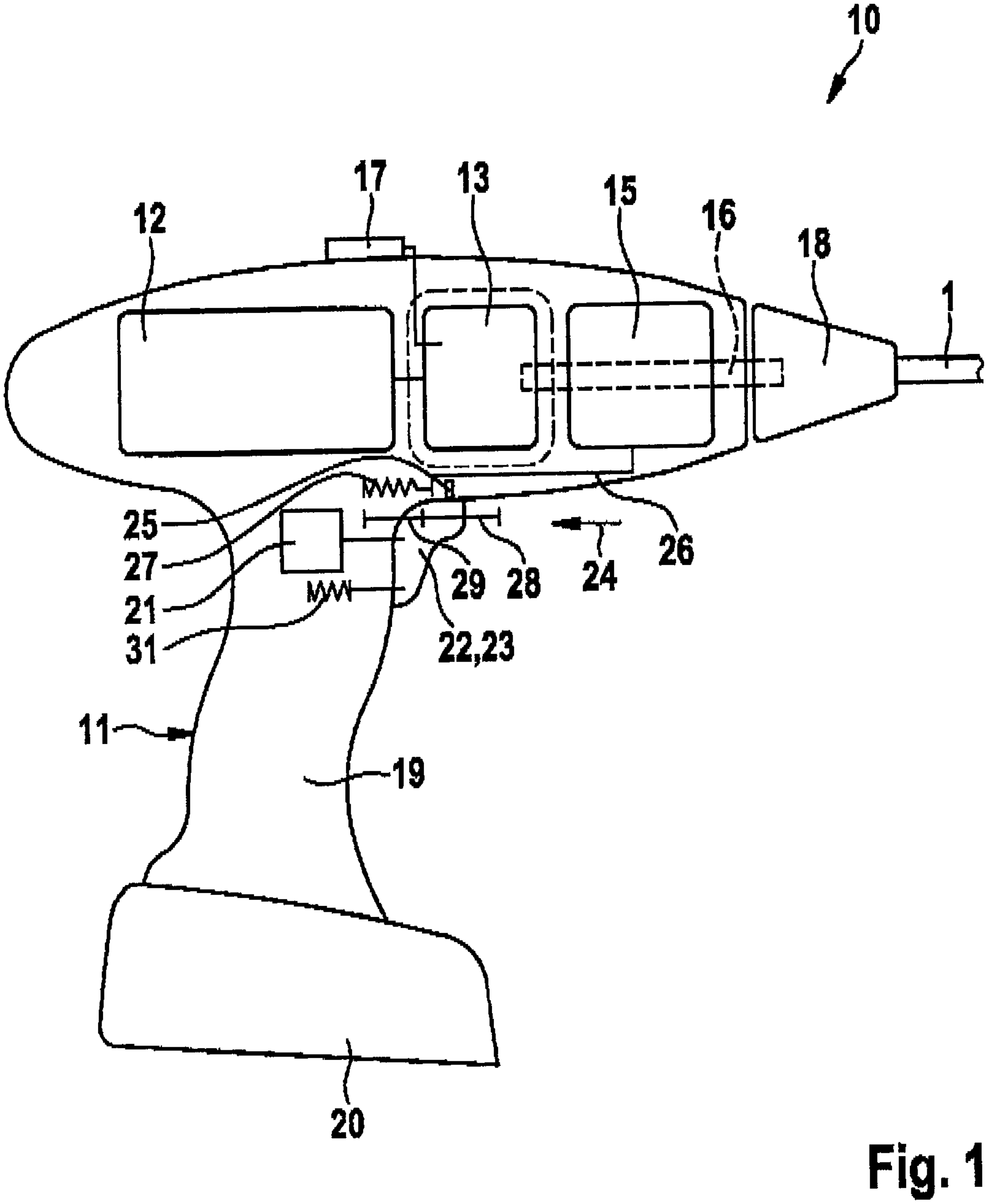
FIG. 1 shows a simplified longitudinal section through an electric handheld machine tool according to the present invention, in the form of a cordless screwdriver.

FIG. 1 shows an electric handheld machine tool 10 developed as a cordless screwdriver. Electric handheld machine tool 10 has a housing 11, in which a drive motor 12 is situated in the form of an electric motor. Drive motor 12 is in operative connection with a gearing 13, whose output shaft, in turn, acts upon a mechanical additional function assembly 15. Additional function assembly 15 is connected to a tool spindle 16, which in turn is connected to a tool holding fixture 18 for accommodating a tool 1, such as a tool bit insert, a drill or the like.

In a modification of the exemplary embodiment shown, it is also conceivable that additional function assembly 15 is developed, for instance, as an (at least partially integral) component of gearing 13 or is situated at another location within electric handheld machine tool 10.

Gearing 13 is particularly developed as planetary gearing, and it preferably has two different transmission steps, which are selectable via an operating element 17 situated on the upper side of housing 11. In particular, using operating element 17, gearing 13 is able to be switched over from a first gear having a relatively low rotational speed to a second gear having a higher rotational speed compared to the first gear and a lower torque.

Using mechanical additional function assembly 15, electric handheld machine tool 10 is able to be switched over to a further or additional operating mode. This additional operating mode is made up, for example, but not exclusively, starting from a drilling function as first operating mode, of a percussion drilling function, a rotary blow function, a hammer drilling function, a torque limitation, a hammer blow function or of a modification in the torque limitation or the like. It is naturally also conceivable, starting from one of the last named functions, that one might activate the drilling function, or another of the functions named, via additional function assembly 15 as an additional operating mode.

At the lower end of handle 19 of housing 11, of electric handheld machine tool 10, an accumulator pack 20 is fastened exchangeably, which is used for the current supply of electric handheld machine tool 10. In this instance, the current flow between accumulator pack 20 and drive motor 12 is influenced, in a manner known per se, via a switching device 21. Switching device 21 has, for example, a potentiometer, not shown, which is mechanically connected to an operating element 22. Operating element 22 is developed as a pushbutton switch element 23 and is able to be operated from the outside, pushbutton switch element 23 being situated on the opposite side of accumulator pack 20, particularly in the area of handle 19.

When pushbutton switch element 23 is operated in the direction of arrow 24, starting from an end position that is disengaged facing out of housing 11, switching device 21 is operated in such a way that current J flowing from accumulator pack 20 in the direction of drive motor 12 is increased which, as a rule, leads to an increase in the rotational speed of drive motor 12. Pushbutton switch element 23 is operationally connected to a spring 31, which presses pushbutton switch element 23 counter to the direction of arrow 24, so that when pushbutton switch element 23 is not operated, no current flow takes place in the direction of drive motor 12.

It is provided, according to the present invention that, during the operation in the direction of arrow 24, as of a certain adjustment travel, operating element 22 cooperates with additional function assembly 15. For this purpose, pushbutton switch element 23 has a cam 25 which, when pushbutton switch element 23 is operated in the direction of arrow 24, becomes engaged in operative connection with a pull rod 26. Pull rod 26 is supported on a return spring 27 that is fixed to the housing, which applies spring force to pull rod 26, counter to the direction of arrow 24. When pull rod 26 is moved in the direction of arrow 24, additional function assembly 15 is actuated, i.e. the appropriately provided function of additional function assembly 15 is connected.

Operating element 22 has a first functional range 28, in which additional function assembly 15 has not yet been activated. The operation of pushbutton switch element 23 in first functional range 28 thereby exclusively effects an increase in the rotational speed of drive motor 12, as a result of an increasing current flow in the direction of drive motor 12. Now, as soon as pushbutton switch element 23 is moved farther in the direction of arrow 24, pushbutton switch element 23 reaches a second functional range 29, in which pushbutton switch element 23 is positioned in operative connection with pull rod 26, additional function assembly 15 being activated thereby. The transition from first functional range 28 to second functional range 29 is haptically perceivable by the operator, since, as of the transitional point between the two functional ranges 28, 29, return spring 27 exerts a pressing force on pull rod 26, counter to the direction of arrow 24.

Figure 2:
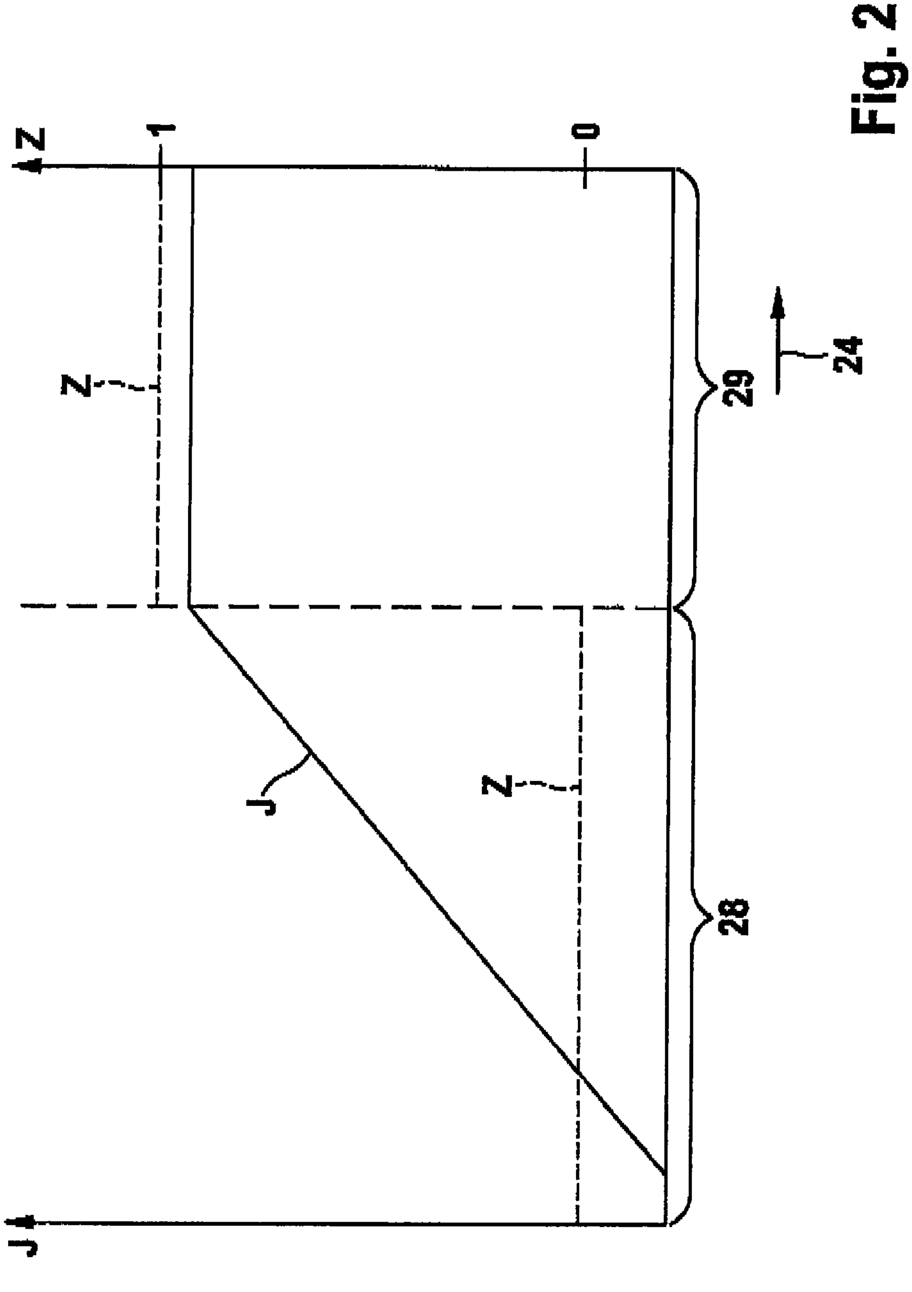
FIG. 2 shows a diagram illustrating the dependencies of the motor current and the additional function assembly as a function of the adjustment travel of the operating element.

The relationships between the two functional ranges 28, 29, that is, the adjustment travel of pushbutton switch element 23 in the direction of arrow 24, motor current J and connection Z of additional function assembly 15, are shown in FIG. 2.

As soon as the operator of pushbutton switch element 23 is no longer actuating it, as a result of the spring force of return spring 31, pull rod 26 is put back into its original function, in which additional function assembly 15 is deactivated, and pushbutton switch element 23 is located in functional range 28 again.

Electric handheld machine tool 10 described up to this point may be adapted or modified in various ways, without deviating from the idea of the present invention. Thus, it is conceivable, for example, that in response to the non-operation of pushbutton switch element 23, additional function assembly 15 is activated, and in response to the operation of pushbutton switch element 23 in the direction of arrow 24, upon the transition from first functional range 28 to second functional range 29, additional function assembly 15 becomes deactivated. Furthermore, the development of electric handheld machine tool 10 is not limited to its design as a cordless screwdriver. Furthermore, other ways of operating pushbutton switch element 23 are conceivable for the activation of the two functional ranges 28, 29. Thus, it may be provided, for instance, that pushbutton switch element 23 first has to be pressed into housing 11 in first functional range 28, in order, subsequently, to activate additional function assembly 15, having to be pressed in a direction perpendicular to the first, for example. Pulling/turning motions or pulling/pressing motions of pushbutton switch element 23, or the like, are conceivable for activating the different functional ranges 28, 29. Furthermore, it is also within the scope of the present invention that, by activating/deactivating additional function assembly 15, a plurality of mechanical additional functions are connected or disconnected (for example, disconnecting a torque limitation while simultaneously connecting a hammer drilling function).

Figure 3:
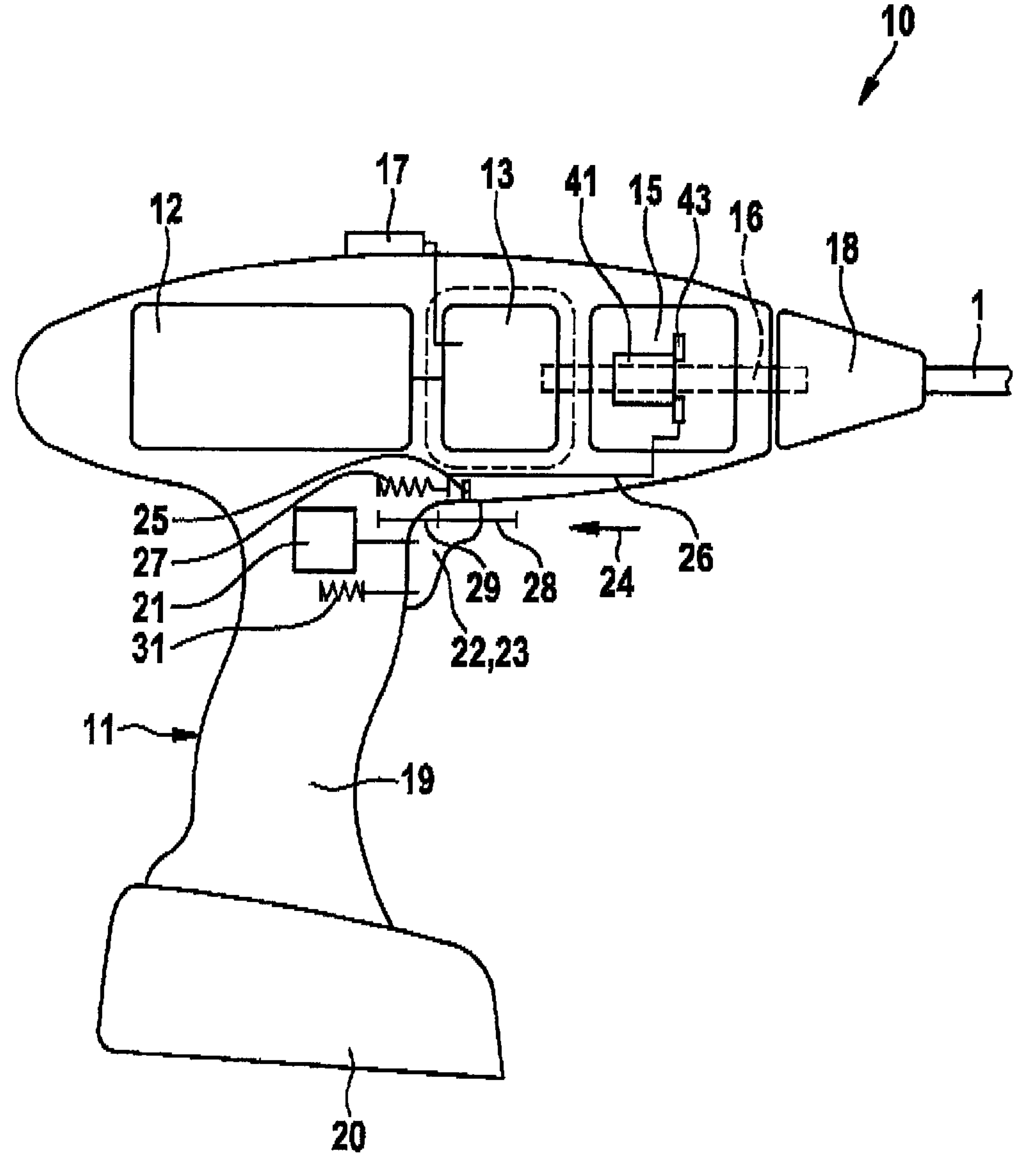
FIG. 3 shows a simplified longitudinal section through an electric handheld machine tool according to the present invention, in the form of a cordless rotary blow screwdriver.

FIG. 3 schematically shows the handheld machine tool, according to the present invention, in the form of a cordless rotary blow screwdriver. Mechanical additional function assembly 15 is formed by a rotary blow mechanism that is known per se, in this context. The rotary blow mechanism includes a percussion member 41. The cordless rotary blow screwdriver is operable in a first functional range 28, a non-striking functional range, and a second functional range 29, a striking functional range. In the non-striking functional range, the rotary blow mechanism is disconnected. For this purpose, the axial motion of percussion member 41 is prevented. In the present exemplary embodiment, the axial motion is prevented by having blocking elements 43 put into operative connection with percussion member 41. This is done by moving blocking elements 43 radially inwards relatively to tool spindle 16. Accordingly, connecting the rotary blow mechanism takes place by shifting blocking elements 43 radially outwards relatively to tool spindle 18, and thereby taking them out of operative connection to percussion element 41. Alternative specific embodiments of blocking elements for blocking the axial motion of percussion element 41 are also conceivable.

For the connection and the disconnection of the rotary blow mechanism, in the specific embodiment according to FIG. 3, pull rod 26 is connected to blocking elements 43.

What is claimed is:

1. An electric handheld machine tool, comprising:

a tool spindle driven by an electric motor;

a gearing situated between the tool spindle and the electric motor;

a manually adjustable operating element which has an adjustment travel, wherein the adjustment travel has at least a first functional range and a second functional range, wherein:

upon switching over between the first and second functional ranges, at least one mechanical additional function of the gearing is mechanically connected;

the manually adjustable operating element is configured as a part of a motor switching element for influencing current through the electric motor; and during the first functional range, the electric motor is configured to be activated but not the at least one mechanical additional function, wherein a variable force is applied to the manually adjustable operating element such that, upon switching over between the first and second functional ranges, an increased force is applied to the manually adjustable operating element, and wherein the increased force causes the manually adjustable operating element to return to the first functional range when the manually adjustable operating element is released, wherein the increased force is provided by at least one spring, and a pull rod supported on a return spring of the at least one spring that is fixed to a housing of the electric handheld machine tool, the return spring configured to apply a spring force to the pull rod in an adjustment travel direction from the second functional range to the first functional range, wherein, upon switching over between the first and second functional ranges, the return spring exerts a pressing force on the pull rod in the adjustment travel direction.

2. The electric handheld machine tool as recited in claim 1, wherein the manually adjustable operating element is a pushbutton switch element.

3. The electric handheld machine tool as recited in claim 1, wherein the electric handheld machine tool is a cordless screwdriver.

4. The electric handheld machine tool as recited in claim 1, wherein the at least one mechanical additional function is one of a percussion drilling function, a rotary impact function, a hammer drilling function, a torque limitation, a drilling function, a chisel function, or a change in the torque limitation.

5. The electric handheld machine tool as recited in claim 1, wherein the at least one mechanical additional function is switched by an additional function assembly situated between the gearing and the tool spindle, and wherein the additional function assembly is mechanically connected to the manually adjustable operating element by a connecting element.

6. The electric handheld machine tool as recited in claim 1, wherein, during the second functional range, the at least one mechanical additional function of the gearing is activated.

7. The electric handheld machine tool as recited in claim 1, wherein the gearing has a plurality of gears, and wherein the gears are operated using a separate gear changeover switch.

8. An electric handheld machine tool, comprising:

a tool spindle driven by an electric motor;

a gearing operatively connected with the tool spindle and the electric motor;

a mechanical additional function device configured to perform a mechanical additional function, the mechanical additional function device being operatively connected with the gearing and the tool spindle;

a first manually adjustable operating element which has an adjustment travel, wherein the adjustment travel has at least a first functional range and a second functional range, wherein:

upon switching over between the first and second functional ranges, the mechanical additional function is activated;

the first manually adjustable operating element is configured as a part of a motor switching element for influencing current through the electric motor; and during the first functional range, the electric motor is configured to be activated but not the at least one mechanical additional function, wherein the gearing is configured to be switched over from a first gear to a second gear via a second manually adjustable operating element, and wherein the mechanical additional function is different from the function of the gearing and is one of a percussion drilling function, a rotary impact function, a hammer drilling function, a torque limitation, a drilling function, a chisel function, or a change in the torque limitation.

9. The electric handheld machine tool as recited in claim 8, wherein a variable force is applied to the manually adjustable operating element such that, upon switching over between the first and second functional ranges, an increased force is applied to the manually adjustable operating element, and wherein the increased force causes the manually adjustable operating element to return to the first functional range when the manually adjustable operating element is released.

10. The electric handheld machine tool as recited in claim 9, wherein the increased force is provided by at least one spring.

11. The electric handheld machine tool as recited in claim 8, wherein the machine tool further comprises:

a pull rod supported on a return spring of the at least one spring that is fixed to a housing of the electric handheld machine tool, the return spring configured to apply a spring force to the pull rod in an adjustment travel direction from the second functional range to the first functional range, wherein, upon switching over between the first and second functional ranges, the return spring exerts a pressing force on the pull rod in the adjustment travel direction.

* * * * *